(12) United States Patent
Kawakami

(10) Patent No.: US 9,139,051 B2
(45) Date of Patent: Sep. 22, 2015

(54) PNEUMATIC TIRE

(75) Inventor: Kazuki Kawakami, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 912 days.

(21) Appl. No.: 13/357,908

(22) Filed: Jan. 25, 2012

(65) Prior Publication Data
US 2012/0205020 A1 Aug. 16, 2012

(30) Foreign Application Priority Data
Feb. 10, 2011 (JP) ................. 2011-027272

(51) Int. Cl.
*B60C 19/08* (2006.01)
*B60C 11/00* (2006.01)

(52) U.S. Cl.
CPC ............. *B60C 19/08* (2013.01); *B60C 11/0058* (2013.04); *B60C 11/0075* (2013.04); *Y10T 152/10855* (2015.01)

(58) Field of Classification Search
CPC .... B60C 19/08; B60C 19/082; B60C 19/084; B60C 19/086; B60C 19/088; B60C 2001/0066; B29D 2030/526
USPC ......................... 152/152.1, DIG. 2; 156/110.1
See application file for complete search history.

(56) References Cited

U.S. PATENT DOCUMENTS

| | | | |
|---|---|---|---|
| 6,951,233 B1* | 10/2005 | Calvar et al. | 152/152.1 |
| 2006/0102264 A1* | 5/2006 | Nicolas | 152/152.1 |
| 2006/0174986 A1* | 8/2006 | Ogawa | 152/152.1 |
| 2006/0180255 A1* | 8/2006 | Marriott et al. | 152/209.5 |
| 2009/0173419 A1* | 7/2009 | Kawakami | 152/152.1 |
| 2010/0132859 A1* | 6/2010 | Steiner et al. | 152/152.1 |
| 2010/0258227 A1* | 10/2010 | Kuroki | 152/209.5 |

FOREIGN PATENT DOCUMENTS

| | | |
|---|---|---|
| JP | 2003-326614 A | 11/2003 |
| JP | 2009-126291 A | 6/2009 |
| JP | 2010-115935 A | 5/2010 |

OTHER PUBLICATIONS

European Search Report dated May 15, 2012, issued in corresponding European Patent Application No. 12153436 (4 pages).

* cited by examiner

*Primary Examiner* — Eric Hug

(57) ABSTRACT

A pneumatic tire has a tread rubber which is formed by a nonconductive rubber and includes a conductive portion. The conductive portion comprises a first, second, third and fourth conductive portions. The first conductive portion extends radially inward from the ground-contacting surface and reaches a cap portion. The second conductive portion is provided continuously in the first conductive portion, extends to one side in the tire width direction between the cap portion and a base portion, and reaches a carcass layer. The third conductive portion is connected to the second conductive portion, extends radially inward from an outer surface of the base portion, and reaches the bottom surface of the tread rubber. The fourth conductive portion is provided continuously in the third conductive portion, extends to another side in the tire width direction along the bottom surface, and reaches the carcass layer.

5 Claims, 6 Drawing Sheets

FIG. 4
(A)
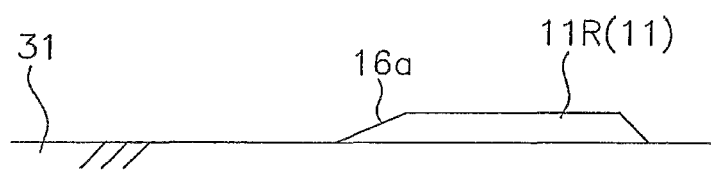
(B)
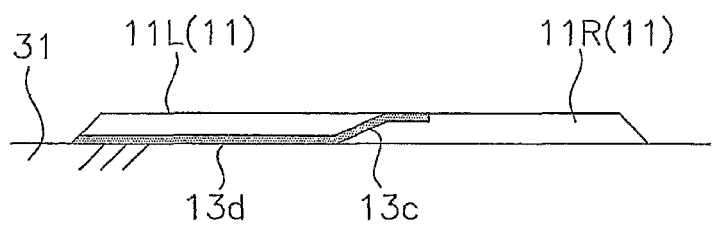
(C)
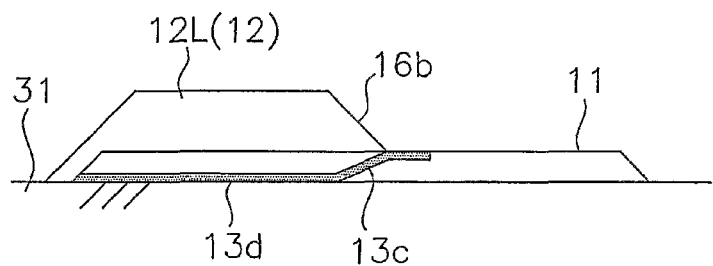
(D)
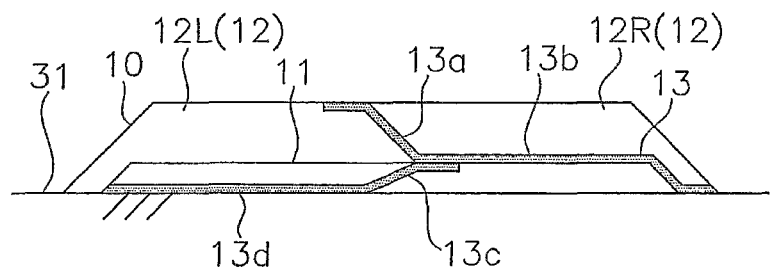

FIG. 13                                                            Comparative Example
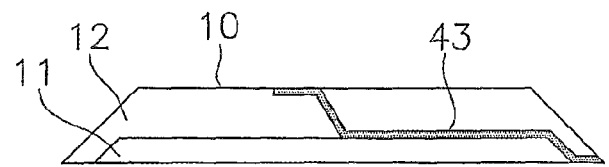
FIG. 14                                                            Comparative Example
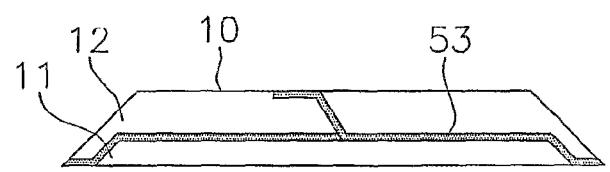
                                                                   Comparative Example
FIG. 15
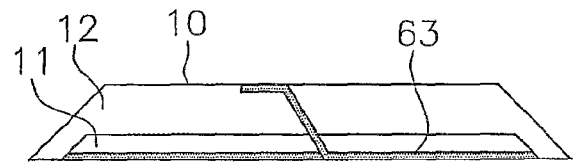

PNEUMATIC TIRE

BACKGROUND OF THE INVENTION

1. Field of the Invention

The present invention relates to a pneumatic tire which can discharge a static electricity generated in a vehicle body and a tire, to a road surface.

2. Description of the Related Art

Recently, there have been proposed a pneumatic tire including a tread rubber blended with silica at a high ratio in order to reduce the rolling resistance that largely affects the fuel consumption of a vehicle and/or to increase braking performance (WET braking performance) on a wet road surface. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

Accordingly, there has been developed a pneumatic tire structured such that a conductive portion constructed by a conductive rubber blended with a carbon black or the like is buried in a tread rubber constructed by a nonconductive rubber blended with a silica or the like, whereby an electrical conduction performance can be achieved. For example, in a pneumatic tire described in Japanese Unexamined Patent Publication No. 2003-326614 and Japanese Unexamined Patent Publication No. 2010-115935, a tread rubber formed by a nonconductive rubber is provided with a conductive portion which extends in a tire radial direction from a ground-contacting surface so as to reach a belt layer, thereby forming a conduction route for discharging a static electricity. However, in that tire, since the conductive route is formed via the belt layer, it can not correspond to a case that a topping rubber of the belt layer is formed by the nonconductive rubber.

On the other hand, in a pneumatic tire described in Japanese Unexamined Patent Publication No. 2009-126291, a tread rubber formed by a nonconductive rubber is provided with a conductive portion which extends to an inner side in a tire radial direction from a ground-contacting surface, extends in a tire width direction between a cap portion and a base portion, and is connected to a side wall rubber or a topping rubber of a carcass layer. However, in the conductive portion which is formed as an L-shaped cross section (refer to FIG. 13), since it is formed such a shape as to be biased to one side in the tire width direction, it has been found that uniformity in a lateral direction of the tire is deteriorated.

Accordingly, there can be thought that the conductive portion is formed as an inverse T-shaped form, and the conductive portion is extended to both sides in the tire width direction between the cap portion and the base portion, for improving the uniformity, however, in the case of structuring so, a strain of a shoulder region becomes large in both sides in the tire width direction, and a rolling resistance tends to be increased. On the contrary, in the case that the conductive portion is kept away from the ground-contacting surface in the shoulder regions in both sides, a strain can be lightened, however, since the shoulder region tends to wear by priority, an irregular wear resistance tends to be lowered.

SUMMARY OF THE INVENTION

The present invention is made by taking the actual condition mentioned above into consideration, and an object of the present invention is to provide a pneumatic tire which can suppress an increase of a rolling resistance and a reduction of an irregular wear resistance, while improving uniformity in a lateral direction of the tire.

The object can be achieved by the following present invention. That is, the present invention provides a pneumatic tire comprising a pair of bead portions, a side wall portion which extends to an outer side in a tire radial direction from each of the bead portions, a tread portion which is connected to an outer end in the tire radial direction of each of the side wall portions, a toroidal carcass layer which is provided between a pair of the bead portions, a side wall rubber which is provided in an outer side of the carcass layer in the side wall portion, and a tread rubber which is provided in an outer side of the carcass layer in the tread portion. The tread rubber has a cap portion which is formed by a nonconductive rubber and constructs a ground-contacting surface, a base portion which is formed by a nonconductive rubber and is provided in an inner side in the tire radial direction of the cap portion, and a conductive portion which is formed by a conductive rubber and reaches a bottom surface of the tread rubber from a ground-contacting surface. And, the conductive portion comprises a first conductive portion which extends to an inner side in the tire radial direction from the ground-contacting surface and reaches an inner peripheral surface of the cap portion, a second conductive portion which is provided in succession with the first conductive portion, extends to one side in the tire width direction between the cap portion and the base portion, and reaches a topping rubber of the carcass layer or the side wall rubber, a third conductive portion which is connected to the second conductive portion between the cap portion and the base portion, and extends to an inner side in the tire radial direction from an outer peripheral surface of the base portion so as to reach the bottom surface of the tread rubber, and a fourth conductive portion which is provided in succession with the third conductive portion, extends to another side in the tire width direction along the bottom surface of the tread rubber, and reaches the topping rubber of the carcass layer or the side wall rubber.

In accordance with the pneumatic tire of the present invention, it is possible to discharge a static electricity generated in the vehicle body and the tire to the road surface through the conductive portion which reaches the bottom surface of the tread rubber from the ground-contacting surface. Further, since the conductive portion reaches the topping rubber of the carcass layer or the side wall rubber from the ground-contacting surface via the first and second conductive portions, or the first, second, third and fourth conductive portions, it is possible to well achieve an electrical conduction performance even in the case that the topping rubber of the belt layer is formed by the nonconductive rubber.

Further, in the pneumatic tire in accordance with the present invention, since the conductive portion includes the second conductive portion which extends to the one side in the tire width direction, and the fourth conductive portion which extends to the another side, it is formed as a laterally balanced shape, and it is possible to improve uniformity in a lateral direction of the tire. In addition, since the second conductive portion extends between the cap portion and the base portion, and the fourth conductive portion extends along the bottom surface of the tread rubber, it is possible to suppress an increase of a rolling resistance and a reduction of an irregular wear resistance by making an increase of a strain be shared by the shoulder region in the one side, and making a promotion of a wear be shared by the shoulder region in the another side.

In the present invention, it is preferable that each of the first conductive portion and the third conductive portion extends while inclining with respect to the tire radial direction, and a difference of inclined widths thereof is equal to or less than 20 mm. In the structure mentioned above, it is possible to improve a rigidity balance between the cap portion and the base portion by making widths of the first conductive portion and the third conductive portion close to each other, thereby improving uniformity in a lateral direction of the tire.

In the present invention, since each of the first conductive portion and the third conductive portion is arranged in the vicinity of the tire equator, it is possible to improve the lateral balance in the conductive portion so as to improve the uniformity in the lateral direction of the tire. Further, the first conductive portion may be arranged at a position which is offset to one side or another side in the tire width direction from the tire equator, and the third conductive portion may be arranged at a position which is offset to a side opposite to the first conductive portion from the tire equator. In accordance with the structure mentioned above, it is possible to arrange the first conductive portion and the third conductive portion in a well-balanced manner laterally so as to improve uniformity in the lateral direction of the tire.

In the present invention, it is preferable that a plurality of branch portions which are branched toward an outer side in the tire diameter direction are formed in each of the first conductive portion, the second conductive portion, the third conductive portion and the fourth conductive portion. Since the first conductive portion and the second conductive portion are provided with the branch portion as mentioned above, a frequency at which the conductive portion is exposed in a process that the wear makes progress is enhanced, thereby being advantageous for securing the electrical conduction performance. Further, it is possible to improve the uniformity in the lateral direction of the tire by forming the branch portion also in the third conductive portion and the fourth conductive portion, in addition to the first conductive portion and the second conductive portion.

BRIEF DESCRIPTION OF THE DRAWINGS

FIGS. 4(A) to 4(D) are cross sectional views schematically showing a forming step of the tread rubber;

FIG. 13 is a cross sectional view showing a tread rubber in accordance with a comparative example 1;

FIG. 14 is a cross sectional view showing a tread rubber in accordance with a comparative example 2; and FIG. 15 is a cross sectional view showing a tread rubber in accordance with a comparative example 3.

DETAILED DESCRIPTION OF PREFERRED EMBODIMENTS

Figure 1:
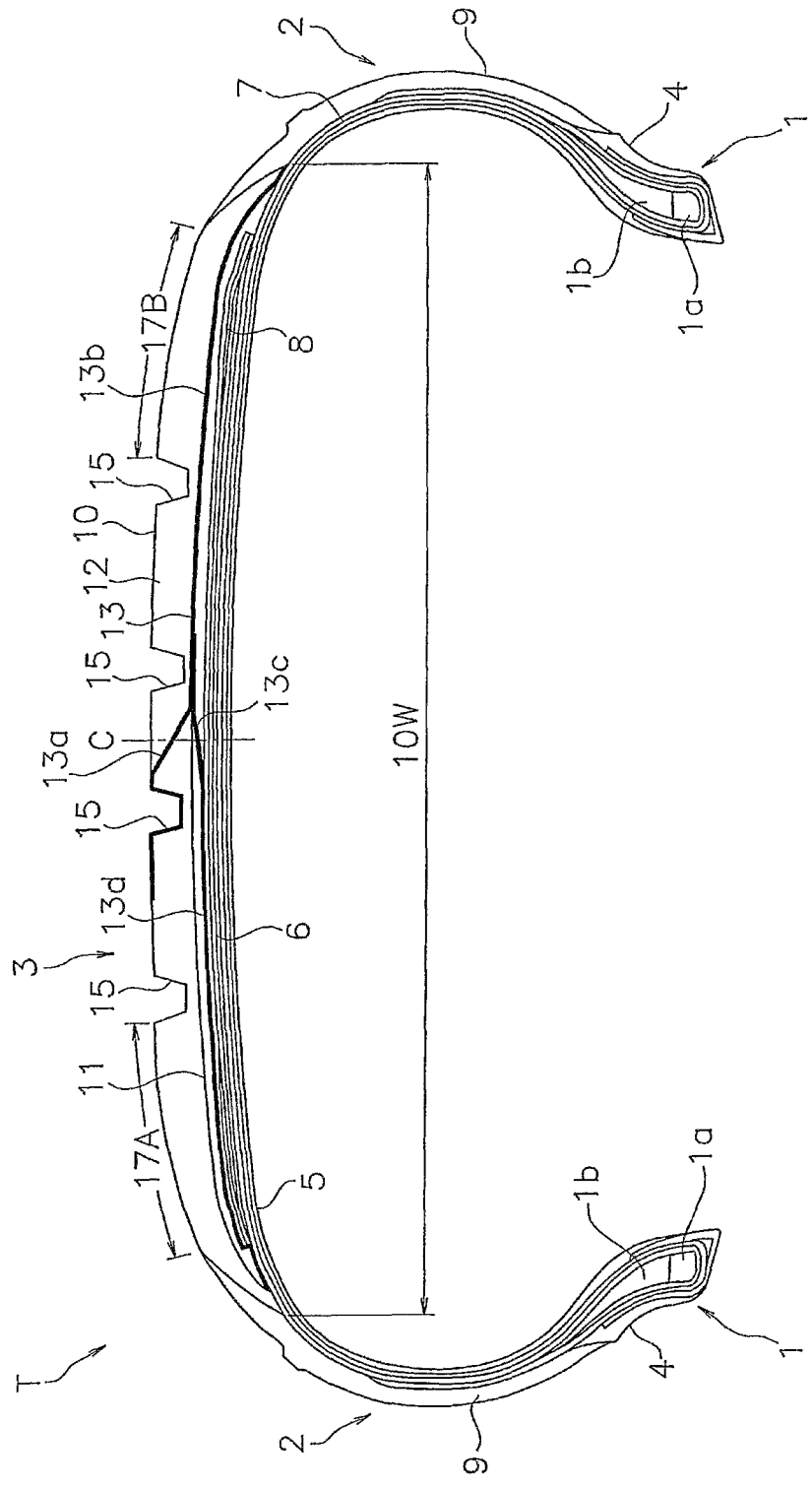
FIG. 1 is a sectional view of a tire meridian showing one example of a pneumatic tire according to the present invention.

An embodiment of the present invention will be explained with reference to the drawings. A pneumatic tire T shown in FIG. 1 includes a pair of bead portions 1, side wall portions 2 extending from the bead portions 1 to outer side in a tire radial direction, a tread portion 3 connected to outer ends in a tire radial direction of the side wall portions 2. The bead portion 1 includes an annular bead 1a composed of a bundle of steel wires or the like sheathed with rubber and a bead filler 1b of hard rubber disposed therein.

A toroid-shaped carcass layer 7 is provided between the pair of bead portions 1, and an end portion thereof is fixed via the bead 1a being wound thereon. The carcass layer 7 is constructed by at least one (two in the present embodiment) carcass plies, and the carcass ply is formed by covering a cord extending at an angle of approximately 90° with respect to the tire equator C with a topping rubber. The carcass layer 7 is provided with an inner liner rubber 5 for maintaining air pressure on the inner periphery thereof.

A rim strip rubber 4 which abuts on a rim (not shown) at a time of being installed to the rim is provided in an outer side of the carcass layer 7 in the bead portion 1. Also, a side wall rubber 9 is provided in an outer side of the carcass layer 7 in the sidewall portion 2. In the present embodiment, the topping rubber of the carcass layer 7 (the topping rubber of the carcass ply) and the rim strip rubber 4 are formed by a conductive rubber respectively, and the side wall rubber 9 is formed by a nonconductive rubber.

An outer side of the carcass layer 7 in the tread portion 3 is provided with a belt layer 6 which is constructed by a plurality of (two in the present embodiment) belt plies, a belt reinforcing layer 8 which is formed by coating cords extending substantially in a tire circumferential direction with a topping rubber, and a tread rubber 10. Each of the belt plies is formed by covering cords extending while inclining with respect to the tire equator C with a topping rubber, and is laminated in such a manner that the cord intersects inversely to each other between the plies. The belt reinforcing layer 8 may be omitted as occasion demands.

The tread rubber 10 comprises of a cap portion 12 formed by a nonconductive rubber and constructing a ground-contacting surface, a base portion 11 formed by a nonconductive rubber and provided in an inner side in a tire radial direction of the cap portion 12, and a conductive portion 13 formed by a conductive rubber and reaches a bottom surface of the tread rubber 10 from the ground-contacting surface. A plurality of main grooves 15 extending along a tire circumferential direction are formed on a surface of the tread rubber 10. In the present specification, regions of the tread rubber 10 in an outer side in the tire width direction than the main groove 15 positioned in an outermost side are called as shoulder regions 17A and 17B.

A rubber hardness of the tread rubber 10 is not particularly limited, but it is possible to harden the cap portion 12 constructing the ground-contacting surface so as to suppress an early wear, by making a rubber hardness Hc of the cap portion 12 higher than a rubber hardness Hb of the base portion 11, for example, by setting the rubber hardness Hc to 67±5 degree, setting the rubber hardness Hb to 57±5 degree, and setting a hardness difference Hc−Hb to 1 to 20 degree (preferably 3 to 15 degree). Further, it is possible to make the rubber hardness Hb of the base portion 11 higher than the rubber hardness Hc of the cap portion 12. The rubber hardness is a value obtained by measuring at 25° C. according to a durometer hardness test (type A) of JISK6253.

The conductive rubber points to a rubber in which a specific volume resistance is less than $10^8$ Ω·cm, and is produced, for example, by blending a carbon black serving as a reinforcing agent in a raw material rubber at a high ratio. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the nonconductive rubber points to a rubber in which a specific volume resistance is equal to or more than $10^8$ Ω·cm, and is produced, for example, by blending a silica serving as the reinforcing agent in the raw material rubber at a high ratio.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

It is preferable that the conductive rubber forming the conductive portion 13 has a composition which satisfies such a relationship that a nitrogen adsorption specific surface area $N_2SA$ (m²/g)×compounding amount (mass %) of the carbon black is equal to or more than 1900, preferably equal to or more than 2000, and a dibutyl phthalate oil absorption DBP (ml/100 g)×compounding amount (mass %) of the carbon black is equal to or more than 1500, preferably equal to or more than 1700, in the light of enhancing the durability of the conductive portion 13 so as to improve the electrical conduction performance. $N_2SA$ is determined in conformity with ASTM D3037-89, and DBP is determined in conformity with ASTM D2414-90.

Figure 2:
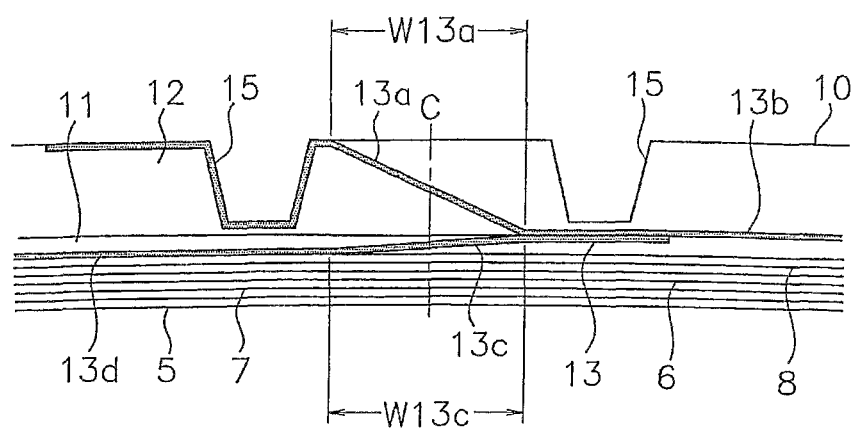
FIG. 2 is an enlarged view showing a substantial part of the tire in FIG. 1.
Figure 3:
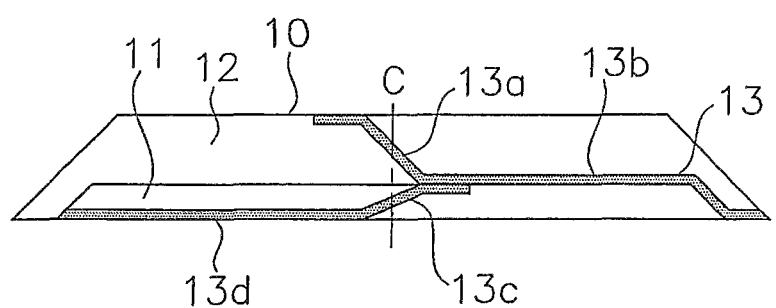
FIG. 3 is a cross sectional view schematically showing a tread rubber before a cure molding.

FIG. 3 schematically shows the tread rubber 10 before the cure molding. As shown in FIGS. 1 to 3, the conductive portion 13 includes a first conductive portion 13a which vertically goes through the cap portion 12, a second conducive portion 13b, a third conductive portion 13c which vertically goes through the base portion 11, and a fourth conductive portion 13d. The first conductive portion 13a extends to an inner side in a tire radial direction from the ground-contacting surface so as to reach an inner peripheral surface of the cap portion 12, and the second conductive portion 13b is provided in succession with this. The second conductive portion 13b extends to one side (a right side in an illustrated example) in the tire width direction between the cap portion 12 and the base portion 11, and reaches the topping rubber of the carcass layer 7.

The third conductive portion 13c is connected to the second conductive portion 13b between the cap portion 12 and the base portion 11, and extends to an inner side in the tire radial direction from an outer peripheral surface of the base portion 11 so as to reach the bottom surface of the tread rubber 10, and the fourth conductive portion 13d is provided in succession with this. The fourth conductive portion 13d extends to another side (a left side in the illustrated example) in the tire width direction along the bottom surface of the tread rubber 10, that is, extends to another side in the tire width direction between the tread rubber 10 and the belt reinforcing layer 8 so as to reach the topping rubber of the carcass layer 7.

The static electricity generated in the vehicle body and the tire is discharged to the road surface from the rim through the conductive route via the rim strip rubber 4, the topping rubber of the carcass layer 7 and the conductive portion 13. Accordingly, in this tire T, it is possible to form the topping rubbers of the belt layer 6 and the belt reinforcing layer 8 by the nonconductive rubber. The conductive portion 13 includes two way conductive routes, in which one is a route which reaches the ground-contacting surface from the carcass layer 7 via the second conductive portion 13b and the first conductive portion 13a, and another is a route which reaches the ground-contacting surface from the carcass layer 7 via the fourth conductive portion 13d, the third conductive portion 13c, the second conductive portion 13b and the first conductive portion 13a.

The conductive portion 13 including the second conductive portion 13b which extends to the one side in the tire width direction, and the fourth conductive portion 13d which extends to the another side is formed as a laterally balanced shape, whereby uniformity in the lateral direction of the tire T is improved. In addition, since the second conductive portion 13b extends between the cap portion 12 and the base portion 11, and the fourth conductive portion 14 extends along the bottom surface of the tread rubber 10, it is possible to suppress an increase of a rolling resistance and a reduction of an irregular wear resistance by making an increase of a strain be shared by the shoulder region in the one side, and making a promotion of a wear be shared by the shoulder region in the another side.

In the shoulder region 17A in a side in which the fourth conductive portion 13d extends, since the conductive portion 13 is kept away from the ground-contacting surface in comparison with the shoulder region 17B in the opposite side, the strain increasing the rolling resistance is lightened, however, the wear tends to be comparatively promoted. However, since it is generally possible to know on the basis of a type of motor vehicle or a use condition (a camber or the like) such a tendency that which of the right and left shoulder regions tends to wear, it is possible to well suppress the reduction of the irregular wear resistance by arranging the fourth conductive portion 13d in the side which is hard to wear.

The ground-contacting surface in which the conductive portion 13 exposes indicates a surface of the tread portion which is grounded on the road surface at a time of assembling in a normal rim, vertically putting the tire on the flat road surface in a state in which a normal internal pressure is charged, and applying a normal load. The normal rim is a rim which is determined per tire by a standard system including a standard on which the tire is based, for example, is a standard rim in JATMA, "Design Rim" in TRA, or "Measuring Rim" in ETRTO.

The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. Further, the normal load is a load determined per tire by a standard system including a standard on which the tire is based, and is a maximum load capacity in JATMA, a maximum value described in the above Table in TRA, or "LOAD CAPACITY" in ETRTO, however, in the case that the tire is for a passenger car, it is set to 85% of a corresponding load to 180 kPa.

Each of the first conductive portion 13a and the third conductive portion 13c extends while inclining with respect to the tire radial direction. An inclination width W13a is a width of a section in which the first conductive portion 13a inclines, and is measured at a section from the ground-contacting surface to the inner peripheral surface of the cap portion 12. In the present embodiment, in order to enhance a freedom of a pattern design, a leading end of the first conductive portion 13a is extended in the tire width direction on the ground-contacting surface. An inclination width W13c is a width of a section in which the third conductive portion 13c inclines, and is measured at a section from the outer peripheral surface of the base portion 11 to the bottom surface of the tread rubber 10.

In the present embodiment, the inclination width W13a and the inclination width W13c are set to the same dimension, however, they may be differentiated. In the light of improving the uniformity in the lateral direction of the tire, it is preferable to make a difference between the inclination widths equal to or less than 20 mm. Further, the inclination widths W13a and W13c are preferably between 10 and 50 mm, and more preferably between 10 and 20 mm, however, 20±15% is preferable in a rate with respect to the tread width 10W.

In the structure in which the first conductive portion 13a and the third conductive portion 13c incline as mentioned above, a frequency of exposure in the process that the wear makes progress is enhanced, in comparison with the structure in which they extend in parallel to the tire radial direction, and particularly in the case of having a branch portion as mentioned below, since the branch portion tends to be exposed to the ground-contacting surface at a time of wearing, it is advantageous for improving the electrical conduction performance. Further, since the first conductive portion 13a and the third conductive portion 13c incline inversely to each other, a rigidity balance of a land portion becomes good at this position, so that it is advantageous for suppressing an irregular wear.

In order to make the lateral balance in the conductive portion 13 good, it can be thought to arrange each of the first conductive portion 13a and the third conductive portion 13c in the vicinity of the tire equator C. In the present embodiment, since the section in which the first conductive portion 13a inclines, and the section in which the third conductive portion 13c inclines overlap in the tire width direction, and the tire equator C is included in the sections, the lateral balance becomes better, and it is possible to accurately improve the uniformity in the lateral direction of the tire.

The third conductive portion 13c has a portion which extends along the outer peripheral surface of the base portion 11 from the inclining section toward further rightward, and brings the portion into contact with the inner peripheral surface of the second conductive portion 13b in an overlapping manner. Since the third conductive portion 13c is provided with the portion overlapping with the second conductive portion 13b between the cap portion 12 and the base portion 11 as mentioned above, it is possible to securely connect the third conductive portion 13c to the second conductive portion 13b.

The conductive portion 13 is provided in such a manner as to be connected to a rim or the rubber which can be conductive from the rim at a time of being installed to the rim. In this tire T, it is possible to form any or all of the topping rubber of the carcass layer 7, the rim strip rubber 4 and the side wall rubber 9 by a nonconductive rubber, and in this case, the second conductive portion 13b and the fourth conductive portion 13d may be extended to the side wall rubber 9, the rim strip rubber 4 or an outer wall surface of the rim strip rubber 4 coming into contact with the rim.

Next, a description will be given briefly of one example of a method of manufacturing the pneumatic tire T, with reference to FIG. 4. Since this tire T can be manufactured in the same manner as the conventional tire manufacturing step except the point relating to the tread rubber 10, a description will be given by focusing on a forming step of the tread rubber.

First of all, as shown in FIG. 4(A), a right half 11R of the base portion 11 is formed by attaching a nonconductive rubber to a forming surface 31 which is constructed by an outer peripheral surface of a forming drum or the like. At this time, an oblique surface 16a for mounting the third conductive portion 13c in a later step is previously formed. Subsequently, as shown in FIG. 4(B), a left half 11L of the base portion 11 is formed by attaching a conductive rubber and the nonconductive rubber. At this time, the third conductive portion 13c is formed by attaching the conductive rubber to the oblique surface 16a, and the fourth conductive portion 13d is formed by attaching the conductive rubber in such a manner as to extend to a left side from the third conductive portion 13c.

Next, as shown in FIG. 4(C), a left half 12L of the cap portion 12 is formed by the nonconductive rubber. At this time, an oblique surface 16b for mounting the first conductive portion 13a in a later step is previously formed. Subsequently, as shown in FIG. 4(D), a right half 12R of the cap portion 12 is formed by attaching the conductive rubber and the nonconductive rubber. At this time, the first conductive portion 13a is formed by attaching the conductive rubber to the oblique surface 16b, and the second conductive portion 13b is formed by attaching the conductive rubber in such a manner as to extend to a right side from the first conductive portion 13a and be connected to the third conductive portion 13c.

The step mentioned above is carried out in accordance with an extrusion forming method or a ribbon winding construction method, and they may be used together. The extrusion forming method is a construction method of extrusion molding a band-like rubber member having a predetermined cross sectional shape and jointing end portions thereof to each other so as to form an annular shape. The ribbon winding method is a construction method of winding an uncured rubber ribbon having a small width spirally in a tire circumferential direction so as to form a desired cross sectional shape. Further, the conductive portion 13 may be formed by arranging a rubber sheet made of the conductive rubber.

A description is omitted in FIG. 4, however, the belt layer 6 and the belt reinforcing layer 8 are arranged in the inner periphery of the tread rubber 10, the green tire is formed by combining the tread rubber 10 with the other tire constructing members such as the carcass layer 7, the side wall rubber 9 and the like, and the pneumatic tire T shown in FIG. 1 is obtained by applying a cure process to the green tire.

[other embodiment]

Figure 5:
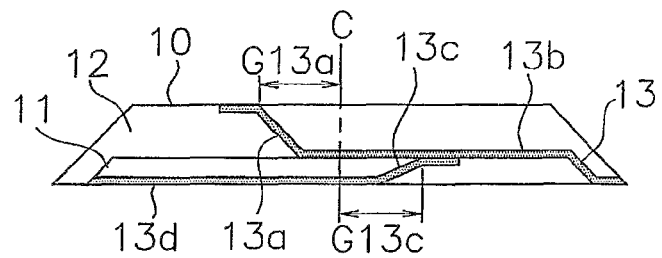
FIG. 5 is a cross sectional view showing a tread rubber in accordance with the other embodiment of the present invention.
Figure 6:
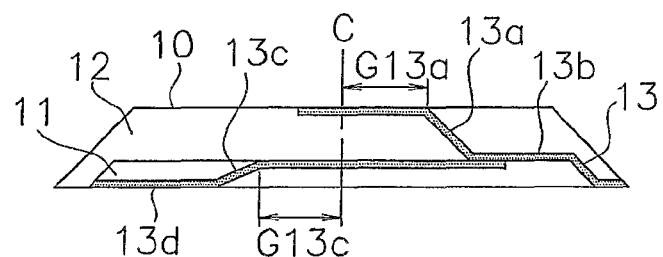
FIG. 6 is a cross sectional view showing a tread rubber in accordance with the other embodiment of the present invention.

(1) In the embodiment mentioned above, there is shown the example in which the first conductive portion 13a and the third conductive portion 13c are arranged in the vicinity of the tire equator C, however, even in the case that they are arranged at positions which are offset in opposite side to each other, as shown in FIGS. 5 and 6, a laterally balanced shape is formed, and it is possible to improve uniformity in the lateral direction of the tire. FIG. 5 is an example in which the first conductive portion 13a is arranged at a position which is offset to another side (a left side in the illustrated example) in the tire width direction, and FIG. 6 is an example in which the first conductive portion 13a is arranged at a position which is offset to one side (a right side in the illustrated example) in the tire width direction.

In the light of improving the uniformity of the tire, a difference between an offset amount G13a of the first conductive portion 13a and an offset amount G13c of the third conductive portion 13c is preferably within 20 mm, and more preferably within 10 mm. The offset amount G13a is a distance from the tire equator C to a position on the ground-contacting surface in a portion which extends in the tire radial direction of the first conductive portion 13a, and the offset amount G13c is a distance from the tire equator C to a position on an outer peripheral surface of the base portion 11 in a portion which extends in the tire radial direction of the third conductive portion 13c.

In the case of arranging the first conductive portion 13a at the position which is offset in the tire width direction, it is preferable to arrange the first conductive portion 13a in the inner side of the vehicle at a time of being installed to the vehicle than the tire equator C, while taking into consideration the camber at a time of being installed to the vehicle, whereby it is easy to secure a frequency at which the conductive portion 13 is grounded. A specification of an installing direction of the tire with respect to the vehicle is carried out, for example, by attaching a notation indicating the vehicle inside or the vehicle outside to the side wall portion 2.

Figure 7:
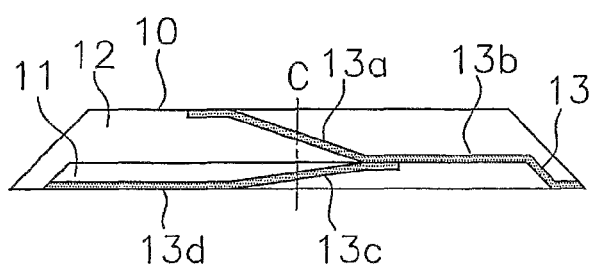
FIG. 7 is a cross sectional view showing a tread rubber in accordance with the other embodiment of the present invention.
Figure 8:
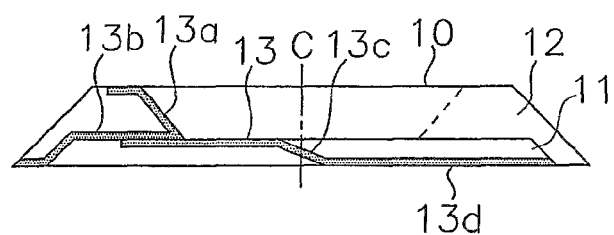
FIG. 8 is a cross sectional view showing a tread rubber in accordance with the other embodiment of the present invention.
Figure 9:
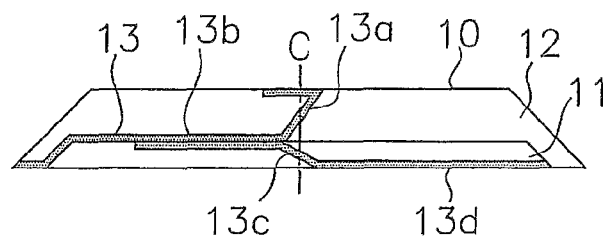
FIG. 9 is a cross sectional view showing a tread rubber in accordance with the other embodiment of the present invention.
Figure 10:
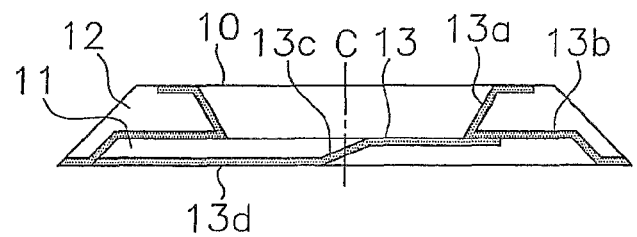
FIG. 10 is a cross sectional view showing a tread rubber in accordance with the other embodiment of the present invention.

(2) In the present invention, a structure as shown in FIGS. 7 to 10 can be even applied. FIG. 7 is an example in which inclined widths of the first conductive portion 13a and the third conductive portion 13c are enlarged, and has the same structure as the tread structure shown in FIG. 3 except this matter. FIGS. 8 and 10 are an example in which a rubber composition of the cap portion is differentiated between the shoulder regions in both sides and the center region in the center, and the first conductive portion 13a is provided in an interface thereof. FIG. 9 is an example in which the rubber composition of the cap portion is differentiated between right and left, and the first conductive portion 13a is provided in an interface thereof.

Figure 11:
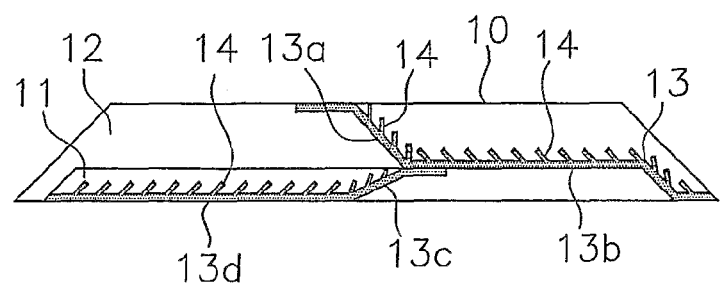
FIG. 11 is a cross sectional view showing a tread rubber in accordance with the other embodiment of the present invention.

(3) In the present invention, the structure may be made, as shown in FIG. 11, such that a plurality of branch portions 14 each of which branches toward an outer side in the tire radial direction are formed in the first conductive portion 13a, the second conductive portion 13b, the third conductive portion 13c and the fourth conductive portion 13d. It is possible to enhance a frequency at which the conductive portion 13 is exposed in the process that the wear makes progress, by forming the branch portions 14 in the first conductive portion 13a and the second conductive portion 13b, thereby well securing the electrical conduction performance. Further, it is possible to improve the uniformity in the lateral direction of the tire by forming the branch portion 14 also in the third conductive portion 13c and the fourth conductive portion 13d.

Figure 12:
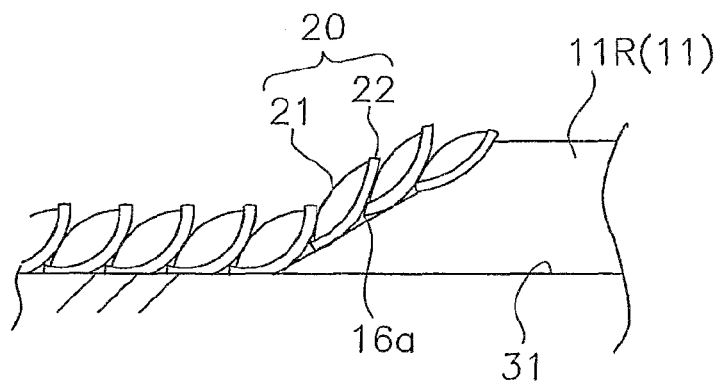
FIG. 12 is a cross sectional view showing a state in which a conductive layer having a branch portion is formed.

FIG. 12 shows a state in which the third conductive portion 13c and the fourth conductive portion 13d which have the branch portions 14 are formed by a ribbon winding construction method. In this step, a multiple-layered rubber ribbon 20 constructed by a nonconductive rubber portion 21 and a conductive rubber portion 22 is spirally overlapped and wound along the tire circumferential direction, in such a manner that one end portion of the conductive rubber portion 22 comes into contact with an abdomen portion of the adjacent conductive rubber portion 22. In this conductive rubber portion 22, a portion which is along the oblique surface 16a comes to the third conductive portion 13c, a portion which is along the forming surface 31 comes to the fourth conductive portion 13d, and the remaining portion comes to the branch portions 14.

EXAMPLE

An example which concretely shows the structure and effect of the present invention will be explained. Each of performance evaluations of the tire was carried out as follows.

(1) Electrical Conduction Performance (Electric Resistance)

An electric resistance value was measured by applying a predetermined load to the tire installed to the rim, and applying an applied voltage (500V) to a metal plate with which the tire grounds from the shaft supporting the rim.

(2) Rolling Resistance

A rolling resistance was measured by a rolling resistance tester and was evaluated. A comparative example 1 is set to 100 and a result is evaluated with indices, the less the numeric value is the more excellent the rolling resistance is.

(3) Irregular Wear Resistance

After traveling at a distance of 12000 km, an amount of wear was measured in a center side (a center region) and an outer side (a shoulder region) of the tread rubber, and a ratio (shoulder/center) between them was evaluated. The closer to 1.0 the numerical value is, the more the irregular wear is suppressed, and it means that the irregular wear resistance is excellent.

(4) Uniformity

Based on a test method defined in JISD4233, LFV (lateral force variation) was measured, and uniformity of a tire was evaluated. Specifically, the tire set to the pneumatic pressure 200 kPa was pressed against a rotating drum in such a manner that a load 640 N is applied, and an amount of fluctuation of a force in a tire lateral direction generated at a time of rotating the tire while keeping a distance between both the shafts constant was measured. A comparative example 1 is set to 100 and a result is evaluated with indices, the less the numeric value is the more excellent the uniformity is.

A size of the tire to be evaluated is 195/65R15, and a tire structure and a rubber composition in each of the examples are in common except the matters shown in Table 1. A specification of the tread rubber in each of the examples is shown in Table 1, and results of evaluation are shown in Table 2. The tread structures in accordance with the comparative examples 1 to 3 and the examples 1 to 7 are respectively as shown in FIGS. 13 to 15, 3 and 5 to 10. In these drawings, a left side corresponds to the vehicle inner side (an in side) and a right side corresponds to the vehicle outer side (an out side).

A comparative example 1 expressed in FIG. 13 has the same structure as the example 1, except a provision of a conductive portion 43 which are not provided with the third conductive portion and the fourth conductive portion. Further, a comparative example 2 expressed in FIG. 14 has the same structure as the comparative example 1, except a matter that a conductive portion 53 extends in the tire width direction between the cap portion 12 and the base portion 11 in the shoulder regions in both sides. Further, a comparative example 3 expressed in FIG. 15 has the same structure as the comparative example 1, except a matter that a conductive portion 63 extends in the tire width direction along the bottom surface of the tread rubber, in the shoulder regions in both sides.

TABLE 1

|  | view expressing tread structure | hardness of cap portion (degree) | first conductive portion | | hardness of base portion | third conductive portion | |
|---|---|---|---|---|---|---|---|
|  |  |  | W13a (mm) | position |  | W13c (mm) | position |
| Comparative Example 1 | FIG. 13 | 67 | 20 | center | 57 | — | — |
| Comparative Example 2 | FIG. 14 | 67 | 20 | center | 57 | — | — |
| Comparative Example 3 | FIG. 15 | 67 | 20 | center | 57 | — | — |
| Example 1 | FIG. 3 | 67 | 20 | center | 57 | 20 | center |
| Example 2 | FIG. 5 | 67 | 20 | offset 30 mm | 57 | 20 | offset 30 mm |
| Example 3 | FIG. 6 | 67 | 20 | offset 30 mm | 57 | 20 | offset 30 mm |
| Example 4 | FIG. 7 | 67 | 40 | center | 57 | 40 | center |
| Example 5 | FIG. 8 | center: 62 shoulder: 72 | 20 | offset 50 mm | 57 | 20 | center |
| Example 6 | FIG. 9 | in side: 62 out side: 72 | 20 | center | 57 | 20 | center |
| Example 7 | FIG. 10 | center: 62 shoulder: 72 | 20 | offset 30 mm | 57 | 20 | center |

TABLE 2

|  | electric resistance (MΩ) | rolling resistance | irregular wear ratio | uniformity (LFV) |
|---|---|---|---|---|
| Comparative Example 1 | 10 | 100 | 1.7 | 100 |
| Comparative Example 2 | 7 | 102 | 1.2 | 95 |
| Comparative Example 3 | 3 | 101 | 1.7 | 102 |
| Example 1 | 3 | 101 | 1.2 | 90 |
| Example 2 | 3 | 101 | 1.2 | 95 |
| Example 3 | 3 | 101 | 1.2 | 95 |
| Example 4 | 3 | 101 | 1.2 | 93 |
| Example 5 | 3 | 101 | 1.4 | 95 |
| Example 6 | 3 | 101 | 1.3 | 93 |
| Example 7 | 3 | 101 | 1.5 | 97 |

From Table 2, it is known that an increase of a rolling resistance and a reduction of an irregular wear resistance can be suppressed while improving uniformity in a lateral direction of the tire, in the examples 1 to 7.

What is claimed is:

1. A pneumatic tire comprising:
   a pair of bead portions;
   a side wall portion which extends to an outer side in a tire radial direction from each of the bead portions;
   a tread portion which is connected to an outer end in the tire radial direction of each of the side wall portions;
   a toroidal carcass layer which is provided between a pair of the bead portions;
   a side wall rubber which is provided in an outer side of the carcass layer in the side wall portion; and
   a tread rubber which is provided in an outer side of the carcass layer in the tread portion,
   wherein the tread rubber has a cap portion which is formed by a nonconductive rubber and constructs a ground-contacting surface, a base portion which is formed by a nonconductive rubber and is provided in an inner side in the tire radial direction of the cap portion, and a conductive portion which is formed by a conductive rubber and reaches a bottom surface of the tread rubber from a ground-contacting surface, and
   wherein the conductive portion comprises:
   a first conductive portion which extends to an inner side in the tire radial direction from the ground-contacting surface and reaches an inner peripheral surface of the cap portion;
   a second conductive portion which is provided in succession with the first conductive portion, extends to one side in the tire width direction between the cap portion and the base portion, and reaches a topping rubber of the carcass layer or the side wall rubber;
   a third conductive portion which is connected to the second conductive portion between the cap portion and the base portion, and extends to an inner side in the tire radial direction from an outer peripheral surface of the base portion so as to reach the bottom surface of the tread rubber; and
   a fourth conductive portion which is provided in succession with the third conductive portion, extends to another side in the tire width direction along the bottom surface of the tread rubber, and reaches the topping rubber of the carcass layer or the side wall rubber, and
   wherein the fourth conductive portion only extends in the direction opposite of the second conductive portion.

2. The pneumatic tire according to claim 1, wherein each of the first conductive portion and the third conductive portion extends while inclining with respect to the tire radial direction, and a difference of inclined widths thereof is equal to or less than 20 mm.

3. The pneumatic tire according to claim 1, wherein each of the first conductive portion and the third conductive portion is arranged in the vicinity of a tire equator.

4. The pneumatic tire according to claim 1,
   wherein the first conductive portion is arranged at a position which is offset to one side or another side in the tire width direction from a tire equator,
   wherein the third conductive portion is arranged at a position which is offset to a side opposite to the first conductive portion from the tire equator,
   wherein a section in which the first conductive portion inclines and a section in which the third conductive portion inclines do not overlap with each other in the tire width direction, and
   wherein the section in which the first conductive portion inclines and the section in which the third conductive portion inclines do not overlap with the tire equator.

5. The pneumatic tire according to claim 1, wherein a plurality of branch portions which are branched toward an outer side in the tire diameter direction are formed in each of the first conductive portion, the second conductive portion, the third conductive portion and the fourth conductive portion.

* * * * *